US008942445B2

(12) United States Patent
Foo et al.

(10) Patent No.: US 8,942,445 B2
(45) Date of Patent: Jan. 27, 2015

(54) METHOD AND SYSTEM FOR CORRECTION OF LUNG DENSITY VARIATION IN POSITRON EMISSION TOMOGRAPHY USING MAGNETIC RESONANCE IMAGING

(75) Inventors: Thomas Kwok-Fah Foo, Clifton Park, NY (US); Christopher Judson Hardy, Niskayuna, NY (US); Albert Henry Roger Lonn, Bucks (GB); Ravindra Mohan Manjeshwar, Glenville, NY (US); Dattesh Dayanand Shanbhag, Bangalore (IN); Sheshadri Thiruvenkadam, Bangalore (IN)

(73) Assignee: General Electric Company, Niskayuna, NY (US)

( * ) Notice: Subject to any disclaimer, the term of this patent is extended or adjusted under 35 U.S.C. 154(b) by 162 days.

(21) Appl. No.: 13/618,079

(22) Filed: Sep. 14, 2012

(65) Prior Publication Data

US 2014/0079304 A1 Mar. 20, 2014

(51) Int. Cl.
*G06K 9/00* (2006.01)
(52) U.S. Cl.
USPC ........................................................ 382/128
(58) Field of Classification Search
None
See application file for complete search history.

(56) References Cited

U.S. PATENT DOCUMENTS

| | | | |
|---|---|---|---|
| 7,283,652 B2 | 10/2007 | Mendonca et al. | |
| 7,397,937 B2 * | 7/2008 | Schneider et al. | 382/130 |
| 7,667,457 B2 | 2/2010 | Lenz et al. | |
| 7,783,092 B2 | 8/2010 | Agam et al. | |
| 7,847,552 B2 | 12/2010 | Haworth et al. | |
| 8,089,279 B2 | 1/2012 | Martin et al. | |
| 8,090,175 B2 | 1/2012 | Fu et al. | |
| 2008/0135769 A1 * | 6/2008 | Rosen | 250/363.09 |
| 2009/0175523 A1 * | 7/2009 | Chen et al. | 382/130 |
| 2009/0252395 A1 * | 10/2009 | Chan et al. | 382/131 |
| 2010/0156416 A1 * | 6/2010 | Martinez-Moller et al. | 324/309 |
| 2010/0204563 A1 * | 8/2010 | Stodilka et al. | 600/411 |
| 2010/0290683 A1 * | 11/2010 | Demeester et al. | 382/131 |
| 2010/0331665 A1 | 12/2010 | Ladebeck et al. | |
| 2011/0123083 A1 | 5/2011 | Ojha et al. | |
| 2011/0187364 A1 | 8/2011 | Blumhagen et al. | |
| 2011/0190626 A1 * | 8/2011 | Mizuno | 600/425 |
| 2011/0284751 A1 * | 11/2011 | Klinder et al. | 250/363.03 |
| 2012/0294503 A1 * | 11/2012 | Fei et al. | 382/131 |
| 2013/0004038 A1 * | 1/2013 | Carmi | 382/128 |

OTHER PUBLICATIONS

Marshall. "Variable Lung Density Consideration in Attenuation Correction of Whole Body PET/MRI" The Journal of Nuclear Medicine, 2012:53:977-984. 2012, hereinafter Marshall.*

(Continued)

*Primary Examiner* — Nirav G Patel
*Assistant Examiner* — Oneal R Mistry
(74) *Attorney, Agent, or Firm* — Fletcher Yoder, P.C.

(57) ABSTRACT

Exemplary embodiments of the present disclosure are directed to correcting lung density variations in positron emission tomography (PET) images of a subject using a magnetic resonance (MR) image. A pulmonary vasculature and an outer extent of a lung cavity can be identified in a MR image corresponding to a thoracic region of the subject in response to an intensity associated with pixels in the MR image. The pixels within the outer extent of the lung cavity are classified as corresponding to the pulmonary vasculature or the lung tissue. Exemplary embodiments of the present disclosure can apply attenuation coefficients to a reconstruction of the PET image based on the classification of the pixels within the outer extent of the lung cavity.

20 Claims, 9 Drawing Sheets

(56) References Cited

OTHER PUBLICATIONS

Schluz et al. "Automatic, three-segement, MR-based attenuation correction for whole-body PET/MR data" Eur J Nucl Med Mol Imaging (2011) 38:138-152, hereinafter Schluz.*

Chon et al. "Regional pulmonary blood flow in dogs by 4D-X-ray CT" J Appl Physiol 101: 1451-1465, 2006, hereinafter Chon.*

Paul E. Kinahan, Bruce H. Hasegawa, Thomas Beyer. "X-ray Based Attenuation Correction for Positron Emission Tomography/Computed Tomography Scanners" Elsevier, Inc., vol. XXXIIII. Jul. 2003, hereinafter Kinahan.*

Moller et al., Tissue Classification as a Potential Approach for Attenuation Correction in Whole-Body PET/MRI: Evaluation with PET/CT Data, Journal of Nuclear Medicine Official Publication Society of Nuclear Medicine (2009), pp. 520-526, vol. 50, Issue 4, 2009.

Agam et al., "Vessel Tree Reconstruction in Thoracic CT Scans With Application to Nodule Detection", IEEE Transactions on Medical Imaging, pp. 486-499, vol. 24, Issue 4, Apr. 2005.

* cited by examiner

Pulmonary vasculature: arteries and veins

Pulmonary vasculature: arteries only

FIG. 10          FIG. 11

METHOD AND SYSTEM FOR CORRECTION OF LUNG DENSITY VARIATION IN POSITRON EMISSION TOMOGRAPHY USING MAGNETIC RESONANCE IMAGING

BACKGROUND

Conventionally, in positron emission tomography (PET) image reconstruction, the lung field is treated as a low-density tissue structure to account for the presence of lung tissue. However, lung tissue and the pulmonary vasculature have significantly different densities (and consequently, different attenuation coefficients). Conventionally, little to no effort has been made to correct for differences in the density between lung tissue and the vasculature. This can result in an incorrect attenuation correction for the 511 keV gamma rays emitted by the PET contrast media. Furthermore, failure to account for the differences in densities of lung tissue and the pulmonary vasculature can lead to sub-optimal image reconstruction and decreased ability to detect uptake of PET contrast media in lung tumors. Inadequate or incorrect attenuation density correction can also result in image artifacts that may obscure pulmonary nodules.

SUMMARY

Exemplary embodiments of the present disclosure are directed to correcting lung density variations in positron emission tomography (PET) images of a subject using MR images. In exemplary embodiments, pixels of MR images that correspond to PET images are identified and/or classified based on the intensity (e.g., brightness) of the pixels and/or a location of the pixels relative to other pixels in the MR image and can be assigned attenuation coefficients based on the classification. The MR images and the PET images can be spatially and/or temporally aligned to map the pixels of the MR images to the pixels of the PET images to associate the attenuation coefficients assigned to pixels of the MR images with the pixels of the PET images so that the attenuation coefficients can be used to account for lung density variations in reconstruction of the PET images. For example, exemplary embodiments of the present disclosure can advantageously generate a pixel-by-pixel map of the lung that accurately classifies lung tissue and pulmonary vasculature to provide significantly improved PET image quality compared to conventional approaches.

Without vascular information, the lung tissue and pulmonary vasculature are conventionally assigned to a uniform mean lung attenuation. By identifying, classifying, and accounting for attenuation of the vascular information using MR images, a higher attenuation can be advantageously assigned in PET image reconstruction to regions of the lung corresponding to the pulmonary vasculature and a lower attenuation can be advantageously assigned to regions of the lung without vasculature. The PET reconstruction using this vascular information can generate a better quantitative and qualitative estimate of the emission activity in the lung than using a conventional mean lung attenuation throughout the lung, minimizing the possible image artifacts in the reconstruction of the PET image due to incorrect assignments of attenuation coefficients.

In one embodiment, a method of correcting lung density variations in a positron emission tomography (PET) image of a subject is disclosed. The method includes identifying a pulmonary vasculature and an outer extent of a lung cavity in a stack of two dimensional magnetic resonance (MR) images or a three-dimensional magnetic resonance image data set corresponding to a thoracic region of the subject in response to an intensity associated with pixels in the MR image. The set of MR images corresponds to the set of PET images of the thoracic region of the subject. The method also includes classifying the pixels within the outer extent of the lung cavity as corresponding to the pulmonary vasculature or the lung tissue and applying attenuation coefficients to correct for attenuation of gamma photons associated with the lung tissue and pulmonary vasculature in a reconstruction of the PET image based on the classification of the pixels within the outer extent of the lung cavity.

In another embodiment, a system to correct lung density variations in a positron emission tomography (PET) image of a subject is disclosed. The system includes a computer-readable storage medium and a processing device. The computer-readable storage medium stores information about a stack of two dimensional magnetic resonance (MR) images or a three-dimensional magnetic resonance image data set of a thoracic region of a subject. The information includes information about pixels forming the MR image, and the MR image corresponds to the PET image of the thoracic region. The processing device is programmed to identify a pulmonary vasculature and an outer extent of a lung cavity in the magnetic resonance (MR) image in response to an intensity associated with the pixels in the MR image, classify the pixels within the outer extent of the lung cavity as corresponding to the pulmonary vasculature or the lung tissue, and apply attenuation coefficients to correct for attenuation of gamma photons associated with the lung tissue and pulmonary vasculature in a reconstruction of the PET image based on the classification of the pixels within the outer extent of the lung cavity.

In yet another embodiment, a non-transitory computer-readable storage medium is disclosed. The non-transitory computer-readable storage medium stores instructions executable by a processing device, wherein execution of the instruction by the processing device causes the processing device to implement a process that includes identifying a pulmonary vasculature and an outer extent of a lung cavity in a stack of two-dimensional magnetic resonance (MR) images or a three-dimensional magnetic resonance image data set corresponding to a thoracic region of the subject in response to an intensity associated with pixels in the MR image. The MR image corresponds to a PET image of the thoracic region (or the MR image data set corresponds to the PET image data set of the thoracic region). Execution of the instructions causes the processing device to implement a process that further includes classifying the pixels within the outer extent of the lung cavity as corresponding to the pulmonary vasculature or the lung tissue and applying attenuation coefficients to correct for attenuation of gamma photons associated with the lung tissue and pulmonary vasculature in a reconstruction of the PET image based on the classification of the pixels within the outer extent of the lung cavity.

In some embodiments, the pulmonary vasculature and the outer extent of the lung cavity can be identified by defining one of the pixels corresponding to the pulmonary vasculature as a seed pixel, determining the outer extent of the lung cavity starting with the seed pixel, progressing away from the seed pixel towards a chest wall until the pixels corresponding to the chest wall are identified, and progressing from the seed pixel towards a diaphragm until the pixels corresponding to the diaphragm are identified. The pixels corresponding to the chest wall and the diaphragm can have a greater intensity than the pixels corresponding to the lung tissue.

In some embodiments, the pulmonary vasculature and the outer extent of the lung cavity can be identified by estimating a body mask, delineating a closed contour of the outer extent of the lung cavity within the body mask based on an air image signal intensity associated with the pixels, and providing gradient information and geometric information in terms of curvature and length minimization constraints to control artifacts in classification of the lung cavity.

In some embodiments, pixels that have not been classified as lung tissue or vasculature can be classified as one of body tissue, bone, or air and the pixels classified as one of body tissue, bone, or air can be assigned a corresponding attenuation coefficient.

In some embodiments, the pulmonary vasculature and the outer extent of the lung cavity can be classified by employing a classification algorithm implementing at least one of region growing, phase field, active contour, or level set techniques.

In some embodiments, the pixels within the outer extent of the lung cavity can be classified by assigning a first attenuation coefficient to the pixels classified as the pulmonary vasculature and assigning a second attenuation coefficient to the pixels classified as the lung tissue.

In some embodiments, the MR image and the PET image can be acquired concurrently and/or the MR image can be acquired using at least one of a gradient-recalled echo pulse sequence, a spoiled gradient-recalled echo pulse sequence, a balanced steady-state free-precession pulse sequence, exogenous magnetic resonance contrast media, or an endogenous contrast mechanism of inherent inflow enhancement of flowing blood. These acquisition techniques can be either a stack of two-dimensional images or a three-dimensional image data set.

In some embodiments, smoothing criteria can be applied to the classification of the pixels to define the outer extent of the lung cavity.

In some embodiments, the MR image can be spatially aligned with the PET image to align the pixels of the lung cavity in the MR image with corresponding pixels of the lung cavity in the PET image. Attenuation coefficients can be applied to correct for attenuation of gamma photons associated with the lung tissue and pulmonary vasculature in a reconstruction of the PET image based on the alignment of the MR image and PET image prior to reconstruction of PET image.

In some embodiments, the MR image may be from a stack of two-dimensional images or a three-dimensional image data set where there may not be a one-to-one correspondence between each image of the MR data set and the PET image data set. However, as both the MR image data set and the PET image data covers the thoracic region, direct corresponding MR images to the PET images in terms of spatial location and orientation can be generated by interpolation or reformation of the MR images, regardless of whether they are a stack of two-dimensional images or a three-dimensional image data set.

In some embodiments, the MR image can be acquired with respiratory gating to associate the MR image with a respiratory phase and the MR image can be temporally aligned with the PET image with respect to the respiratory phase prior to applying the attenuation coefficients in PET reconstruction. After PET image reconstruction, the PET image can be spatially deformed to reference the respiratory phase and the reconstructed and spatially deformed PET images can be combined to obtain an average for a plurality of respiratory phases to form a single individual PET image at the reference respiratory phase.

Any combination or permutation of embodiments is envisaged. Other objects and features will become apparent from the following detailed description considered in conjunction with the accompanying drawings. It is to be understood, however, that the drawings are designed as an illustration only and not as a definition of the limits of the invention.

DETAILED DESCRIPTION

Exemplary embodiments are directed to correcting lung density variations in a set of positron emission tomography (PET) images of a subject using MR images. In exemplary embodiments, pixels of MR images that correspond to PET images are identified and/or classified based on the intensity (e.g., brightness) and phase (e.g. phase texture) of the pixels and/or a location of the pixels relative to other pixels in the MR image. For example, exemplary embodiments of the present disclosure can identify the outer extent of a lung cavity in the MR images. The pixels can be classified as corresponding to lung tissue, the pulmonary vasculature (e.g., pulmonary arteries and veins), air, bone, or body tissue (e.g., muscle and fat) and can be assigned attenuation coefficients based on the appropriate classification. The attenuation values can be discrete set of values or continuous range of values, depending on classification scheme. For contrast enhanced MRI scan, the pre-contrast scan can also be used to identify the external contour of the lung. The MR images and the PET images can be spatially and/or temporally aligned to map the pixels of the MR images to the pixels of the PET images to associated the attenuation coefficients assigned to pixels of the MR images with the pixels of the PET images so that the attenuation coefficients can be used to account for lung density variations in reconstruction of the PET images.

Figure 1:
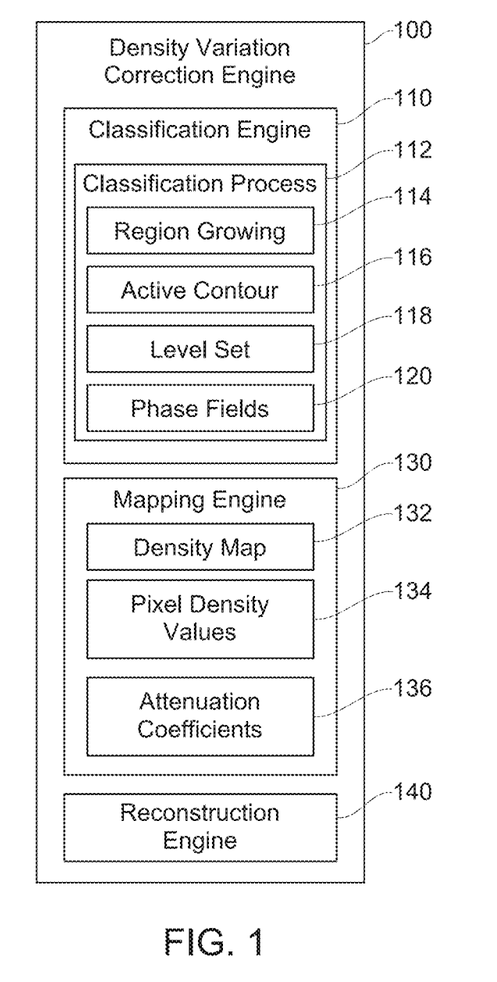
FIG. 1 is a block diagram of an exemplary embodiment of a PET image density variation correction engine.

FIG. 1 is a block diagram of an exemplary positron emission tomography (PET) image density variation correction engine 100 programmed and/or configured to correct for lung density variations in PET images of a thoracic region of a subject, e.g., a lung cavity of human, using acquired magnetic resonance images. The engine 100 can include a classification engine 110, a mapping engine 130, and a reconstruction engine 140. The engine 100 can be programmed and/or configured to determine the boundaries of the lung cavity in an MR image, classify the pixels of the MR image, assign pixel density values to the pixels of the MR images based on the classification, and to reconstruct a PET image using attenuation coefficients corresponding to the pixel density values assigned to the pixels in the MR image.

The classification engine 110 can be programmed and/or configured to implement a classification process 112 that contours a surface of lung tissue to identify and/or segment the pulmonary vasculature and/or the outer extent of the lung cavity (e.g., the lung boundary) in acquired MR images. The classification process 112 implemented by classification engine 110 can utilize one or more classification approaches, such as region growing 114, active contour 116, level set 118, phase fields 120, and/or combination of these approaches. The classification engine 110 can programmatically classify the pixels in the MR images as pulmonary vasculature, lung tissue, air, bone, body tissue (e.g., muscle or fat). The classification engine 110 can programmatically identify the pixels in the MR images corresponding to the pulmonary vasculature and/or the outer extent of the lung cavity based on intensity associated with the pixels in the MR images and/or a location of the pixels in the MR images. The intensity of the images inside the lungs can be selectively enhanced by using specialized contrast enhancement filters (e.g., sigmoid enhancement) inside the lung region contour and selective thresholding applied.

The region growing approach 114 can identify a starting point in an MR image or a combination of MRI images (e.g. pre and post contrast or multi-parametric DIXON fat/water images), such as one or more pixels (e.g., seed pixels), based on, e.g., an intensity of the seed pixels, or using the phase information from complex MRI data and a location of the seed pixels relative to the other pixels in the MR image and can begin comparing neighboring pixels to a specified intensity threshold. The region algorithm approach 114 continues to process pixels with increasing distance from the seed pixels so that the region within which pixels have been compared to the specified threshold intensity or other metric such as phase texture grows as the distance between the pixels being processed by the region growing approach 114 and the seed pixels increases.

The active contour approach 116 can be used to detect a boundary between pixels having one intensity and pixels having intensity by encompassing or encircling a boundary to be identified with a perimeter and minimizing the perimeter until a transition from one pixel intensity to another pixel intensity is detected. The transition from one pixel intensity to another pixel intensity identifies a boundary region.

The level set approach 118 can step through an MR image or a combination of MRI images (e.g. pre and post contrast or multi-parametric DIXON fat/water images), along one or more axes and can identify a general shape and boundary between pixels of one intensity and pixels of another intensity for each step to generate a contour of the boundary between pixels of different intensities.

The phase fields approach 120 can be used to classify pixels based on a fuzzy membership functions scheme to provide a robust segmentation in presence of noise, gaps and intensity variations. Exemplary embodiments of the phase fields approach 120 can be implemented using a binary indicator function to determine a boundary or transition between pixels of different intensities, using information (also referred to herein as a "data-term" or "data portion") from complex MRI data, multi-parametric MRI images (e.g. water/fat channels, pre- and post-contrast MRI data). For example, the binary indicator function is zero ("0") for background pixel data term distribution close to Gaussian distribution, compared to tissue intensity distribution, which is labeled as 1 or vice versa. The classification process 112 can be programmatically implemented by the classification engine 110 to classify the pixels of the MR images within the outer extent of the lung cavity as corresponding to the pulmonary vasculature or to the lung tissue to segment the pulmonary vasculature out of the MR images. Likewise, the classification process 112 can be programmatically implemented by the classification engine 110 to classify the pixels of the MR images outside of the outer extent of the lung cavity as corresponding to bone, air, or body tissue (e.g., muscle and fat) to segment bone, air, and body tissue out of the MR images.

In an exemplary embodiment, the classification engine 110 can implement a region growing and phase field classification algorithm that can be expressed using the following equation:

$$E[u] = \int_{\Omega_{body}} u^2 (I - c_{lungs})^2 \, dx + \int_{\Omega_{body}} (1-u)^2 \frac{\alpha}{1 + \beta(I - c_{lungs})^2} \, dx + \tilde{\lambda} \int_{\Omega_{body}} u^2 (1-u)^2 \, dx + \lambda \int_{\Omega_{body}} |\nabla u|^2 \, dx \quad (1)$$

where u as a function of x is a binary indicator function that is zero (0) when an intensity of a pixel indicates that the pixel corresponds to a specified pixel type (e.g. in Eq. (1) to be tissue) and one (1) when an intensity of a pixel indicates that the pixel does not corresponds to the specified pixel type (e.g. in Eq (1) to be lungs), I is the data-term which can encompass: intensity of a pixel or pixels (from complex MRI data, multi-parametric protocols/images) or gradient information, $c_{lungs}$ is a constant associated with the data-term of a pixel type to be identified (e.g., an intensity associated with a pixel corresponding to the pulmonary vasculature, lung tissue, air, bone, body tissue), parameters $\alpha$, $\beta$, and $\lambda$ represent noise variance, smoothness, and sensitivity/granularity, and may be manually set or determined automatically (e.g. signal-to-noise ratio estimated using the k-space associated with an MR image). In particular, $\beta$ relates to the standard deviation of the background distribution, and $\lambda$ captures the scale of the segmentation used to produce an accurate contour. It should be noted that, for finer, internal anatomies of interest, varying values for $\lambda$ may be used. For example, a smaller value for $\lambda$ may be used for a station encompassing the trachea as compared to a value of $\lambda$ that may be used for a station encompassing the bulk of the lungs. Further, these parameters may be validated empirically and/or may be cross-validated using clean slices. The Euler Lagrange equation of (1) is a linear partial differential equation (PDE), which is minimized using descent. The descent equation is solved using a semi-implicit iterative method in a multi-resolution framework. Thresholding of u may also be performed every few iterations to maintain the value of u in {0, 1}. By way of non-limiting example, the initial mask produced using this method may be set to between 1 and 10 pixel widths from the calculated boundary, and $c_{lungs}$ may be set using an initial region. Values for $c_{lungs}$ may also be added to updates.

The first two segments of Eq. 1 represent a data portion for determining a type of pixel and the last two segments of Eq. 1 represent smoothing terms to reduce abrupt transitions between pixel types and to fill in the boundaries between pixel types. In exemplary embodiments, Eq. 1 can be used to determine an air-to-body boundary, a lung cavity boundary, or any other boundary or transition from one pixel type (e.g., air) to another pixel type (e.g. lung tissue).

The mapping engine 130 can be programmed and/or configured to map the classified pixels to their corresponding structure (e.g., pulmonary vasculature, lung tissue, air, body tissue, bone) to assign pixel density values to the pixels that correspond to their respective classification. For example, the mapping engine 130 can be programmed and/or configured to assign pixels classified as lung tissue a pixel density value that corresponds to a density of lung tissue, pixels classified as pulmonary vasculature a pixel density value that corresponds to a density of the pulmonary vasculature, pixels classified as bone a pixel density value that corresponds to a density of bone, pixels classified as air a pixel density value that corresponds to a density of air, and pixels classified as body tissue a pixel density value that corresponds to a density of the body tissue.

The mapping engine 130 can generate a density map 132 that includes the pixel density values 134 assigned to the pixels corresponding to the subject's lung cavity based on the classification performed by the classification engine 110. The mapping engine 130 can spatially align the pixels in the MR images with the corresponding pixels in the PET images to align the lung cavity in the MR image with the lung cavity in the PET image so that the pixels of the MR images can be mapped to corresponding pixels of the PET images. Providing the density map 132 as a pixel-by-pixel map of the lung that accurately classifies lung tissue and pulmonary vasculature can result in significantly improved PET image quality compared to conventional approaches. The mapping engine 130 uses the pixel density values assigned to the pixels of the MR images to identify and/or determine attenuation coefficients 136 to be applied to the corresponding pixels of the PET image to correct for attenuation of gamma photons. In exemplary embodiments, a relationship between the density values and the attenuation coefficients can be stored for lung tissue, the pulmonary vasculature, bone, air, and/or body tissue. In some embodiments, the mapping engine can generate an attenuation coefficient mapping directly without generating a density map.

In some embodiments, the pixels of in the PET images can be larger than the pixels in the MR images due to, for example, a lower resolution of the PET scanner. When the mapping engine generates the density map, the mapping engine 130 can account for pixel size variations between the PET images and the MR images such that attenuation coefficients are assigned to corresponding pixels for PET image reconstruction.

In some embodiments, the image locations of the MR images and perhaps even the image orientation may not necessarily correspond to that of the PET images. The mapping engine 130 can account for these differences through a preprocessing step that interpolates or reformats the MR images into corresponding pixels to the PET images. In this manner, the spatial and orientation differences between the PET images and MR images are accounted for such that attenuation coefficients are assigned the correct corresponding pixels for PET image reconstruction.

In some embodiments, the mapping engine 130 may first assign attenuation coefficient values to the pixels in the MR images in their original acquisition locations or orientations. Subsequent to that operation, a further processing step that interpolates or reformats the MR images into corresponding pixels to the PET images is performed. In this manner, the spatial and orientation differences between the PET images and MR images are accounted for such that attenuation coefficients are assigned the correct corresponding pixels for PET image reconstruction.

In exemplary embodiments, the MR images and the PET images can be acquired using respiratory gating to capture images of the lung cavity for one or more respiratory phases, such as at one or more portions of the inhale-exhale cycle. For embodiment in which the MR images are acquired with respiratory gating, the mapping engine 130 can programmatically and temporally align the MR image with the PET image based on the respiratory phase so that the MR images and the PET images correspond to a substantially equivalent respiratory phase prior to applying the attenuation coefficients by the reconstruction engine.

The reconstruction engine 140 can be programmed and/or configured to reconstruct the PET images using the attenuation coefficients determined by the mapping engine 130. The attenuation coefficients are applied to the pixels of the PET image to correct for the attenuation of the gamma photons in the PET image. The attenuation coefficients can be applied in a reconstruction of the PET image based on the alignment of the MR image and PET image prior to reconstruction of PET image by the mapping engine 130.

In exemplary embodiments, the MR images and PET images can be acquired concurrently using a combined or hybrid MRI-PET scanner and/or respiratory gating. Respiratory gating can be used to associate the MR images and PET images with a respiratory phase (e.g., inhale, exhale). For embodiments in which the MR images and/or PET images are acquired using respiratory gating, the PET images can be spatially deformed to reference the respiratory phase after reconstruction by the reconstruction engine 140 and the reconstructed PET images and the spatially deformed PET images can be combined to average the PET data for the respiratory phases and form a single individual PET image at a reference respiratory phase.

Figure 2:
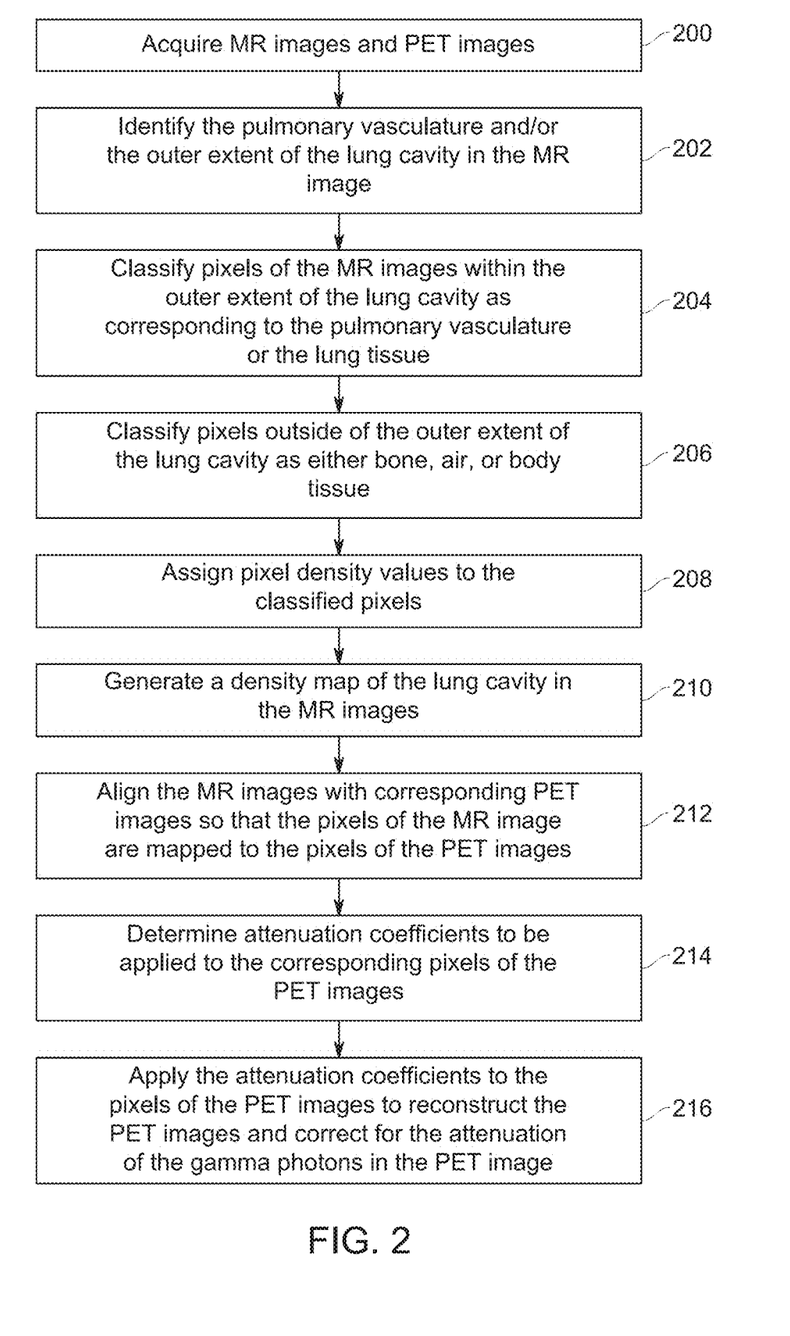
FIG. 2 is a flowchart of an exemplary process for correcting lung density variations in a positron emission tomography (PET) image using magnetic resonance imaging.

FIG. 2 is a flowchart of an exemplary process for correcting lung density variations in a positron emission tomography (PET) image of a thoracic region of a subject, e.g., a lung cavity of human, using magnetic resonance imaging. To begin, one or more magnetic resonance (MR) images and PET images are acquired (200). In exemplary embodiments, the MR images and the PET images can be acquired concurrently, and the MR images can be acquired with or without contrast enhancement. The one or more magnetic resonance images can be acquired to provide slice-by-slice images (through either a stack of two-dimensional acquisitions or a three-dimensional volumetric acquisition) to depict the pulmonary vasculature and outer extent of the lung cavity of the subject.

Once the MR images are obtained, a surface of lung tissue in the MR images is contoured to identify and/or classify the pulmonary vasculature and/or the outer extent of the lung cavity (e.g., the lung boundary) in the MR images (202). In exemplary embodiments, the surface of the lung tissue can be contoured using one or more classification algorithms, such as region growing, active contour, level set, phase fields, and/or combination of these classification techniques The pixels in the MR images identifying the pulmonary vasculature and the outer extent of a lung cavity in a magnetic resonance (MR) image corresponding to the thoracic region of the subject are identified based on an intensity associated with the pixels in the MR image. The pixels of the MR images within the outer extent of the lung cavity are classified as corresponding to the pulmonary vasculature or the lung tissue (204) and the pixels outside of the outer extent of the lung cavity are classified as either bone, air, or body tissue (206).

The classified pixels are assigned pixel density values that correspond to their respective classification (208). For example, pixels classified as lung tissue can be assigned a pixel density value that corresponds to a density of lung tissue, pixels classified as pulmonary vasculature can be assigned a pixel density value that corresponds to a density of the pulmonary vasculature, pixels classified as bone can be assigned a pixel density value that corresponds to a density of bone, pixels classified as air can be assigned a pixel density value that corresponds to a density of air, and pixels classified as body tissue can be assigned a pixel density value that corresponds to a density of body tissue. A density map of the lung cavity in the MR images can be generated based on the pixel density values assigned to the pixels (210).

The MR images are aligned with corresponding PET images of the subject's thoracic region so that the pixels of the MR image can be mapped to the pixels of the PET images (212). The pixel density values assigned to the pixels of the MR images and included in the density map are used to determine attenuation coefficients to be applied to the corresponding pixels of the PET images (214). The attenuation coefficients are applied to the pixels of the PET image to reconstruct the PET image to correct for the attenuation of the gamma photons in the PET image (216).

Figure 3:
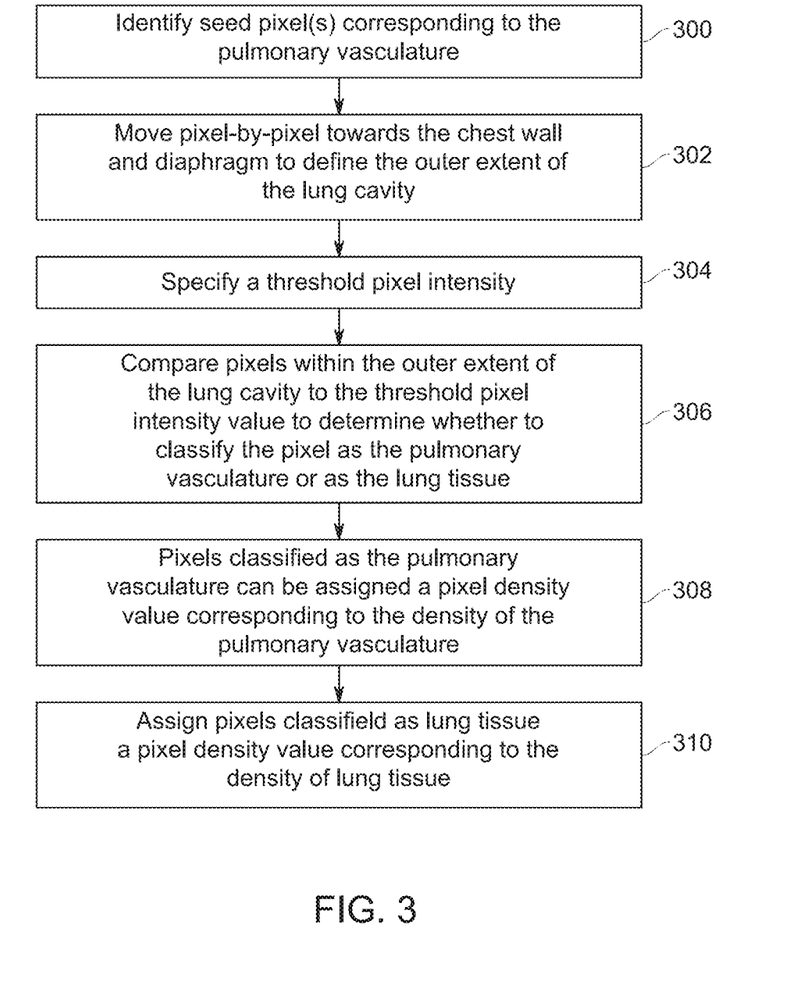
FIG. 3 is a flowchart of an exemplary classification process that can be implemented in accordance with exemplary embodiments of the present disclosure.

FIG. 3 is a flowchart of an exemplary classification process that can be implemented in accordance with exemplary embodiments of the present disclosure to identify the outer extent of the lung cavity and classify pixels within the outer extent. In this embodiment, the classification process can identify the outer extent of the lung cavity (e.g., the lung boundary) in the MR images starting from the pulmonary vasculature and moving outwards towards the chest wall and the diaphragm. The classification process can operate on a pixel-by-pixel basis in the MR image. For example, one or more seed pixels corresponding to the pulmonary vasculature can be identified based on an intensity and/or location of the pixels (300). The one or more seed pixels can correspond to a starting point for the classification process, which, for example, can implement a region-growing and/or pixel intensity threshold-based algorithm. The one or more seed pixels can be programmatically selected to automatically identify the one or more seed pixels and/or can be manually selected to manually identify the one or more seed pixels. Programmatic selection of the one or more seed pixels can utilize the fact that the MR images acquired in a sagittal plane and at a location lateral from the midline of the body can have bright pixels (e.g., pixels with a high intensity) that are assumed to be the pulmonary vasculature. Once the one or more seed pixels have been identified, region-growing from the vasculature pixels outwards pixel-by-pixel towards the chest wall and also caudally towards the diaphragm is performed to define the outer extent of the lung cavity (302).

In exemplary embodiments, a threshold pixel intensity can be specified (304) and the pixels within the outer extent of the lung cavity can be compared to the threshold pixel intensity value to determine whether to classify the pixel as the pulmonary vasculature or as the lung tissue (306). For example, pixels that have an intensity that is greater than the threshold pixel intensity value can be classified as the pulmonary vasculature and pixels that have an intensity that is equal to or less then the threshold pixel intensity value can be classified as the lung tissue. Pixels classified as the pulmonary vasculature can be assigned a pixel density value corresponding to the density of the pulmonary vasculature (308) and pixels classified as the lung tissue can be assigned a pixel density value corresponding to the density of lung tissue (310). Pixels outside of the outer extent of the lung cavity can be segmented using known (model-based) characteristics as body tissue (muscle and fat), air, or bone.

Figure 4:
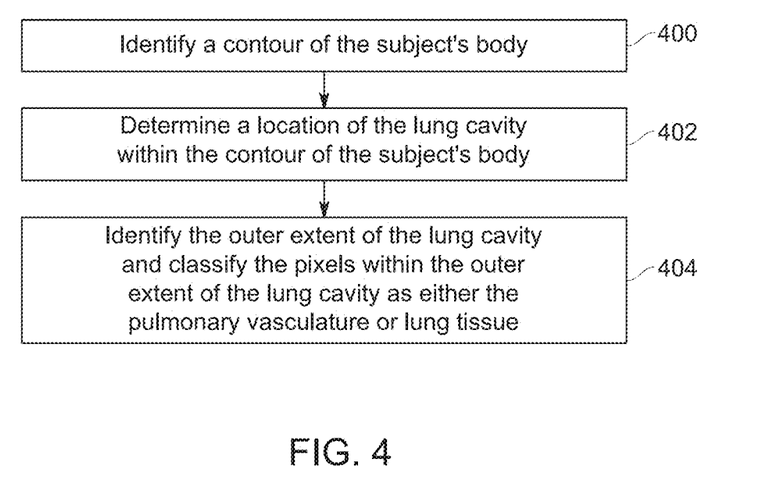
FIG. 4 is a flowchart of another exemplary classification process that can be implemented in accordance with exemplary embodiments of the present disclosure.

FIG. 4 is a flowchart of another exemplary classification process that can be implemented in accordance with exemplary embodiments of the present disclosure to identify the outer extent of the lung cavity. In this embodiment, information from pixels outside the subject's body corresponding to air is used to make an initial estimate of a location of dark lung tissue signal (i.e. pixels have a low intensity). To begin, a contour of the subject's body is identified based on the intensity of the pixels corresponding to air and the pixels corresponding to the body (400). For example, the intensity of the pixels corresponding to air is less than the intensity of the pixels corresponding to the body. Once the contour of the body has been identified, the classification engine 110 can programmatically determine a generally location of the lung cavity based on a location of low intensity lung tissue pixels with respect to body contour (402). Once the location of the lung cavity has been identified, the classification engine 110 can proceed, for example, as described herein to identify the outer extent of the lung cavity and to classify the pixels within the outer extent of the lung cavity as either the pulmonary vasculature or lung tissue (404). The particular classification approaches (e.g., region growing, active contour, level sets, phase field) executed by the classification engine 110 can be specified based on a specified or desired pixel wise accuracy and/or computational speed. In some embodiments, MR data can be pre-processed for MR intensity variation using, e.g., phased array uniformity enhancement (PURE) and/or non-parametric non-uniform intensity normalization (N3) algorithms.

In exemplary embodiments, information from image gradients as well as geometric constraints such as length minimization, mean curvatures, and edge information can be used by the classification engine 110 to ensure that artifacts typically due to susceptibility related loss (e.g., metal sutures/cardiac valves) are not incorrectly classified. This ensures that dark structures in adjacent vicinity of the lungs are not classified as belonging to the lung cavity and ensures better fidelity of lung classification. A multi-scale approach can used to optimize the computational efficiency as well as pixel-by-pixel accuracy. The classification parameters can be varied over imaging volume to ensure that scale of structures are reliably captured without compromising on the classification quality and ensuring that false-positives are kept to minimum. For embodiments in which non-attenuation corrected (NAC) PET is available, the classification engine can use the body contour data to ensure that the lung classification has not leaked due to signal drop outs from metal related artifacts.

Figure 5:
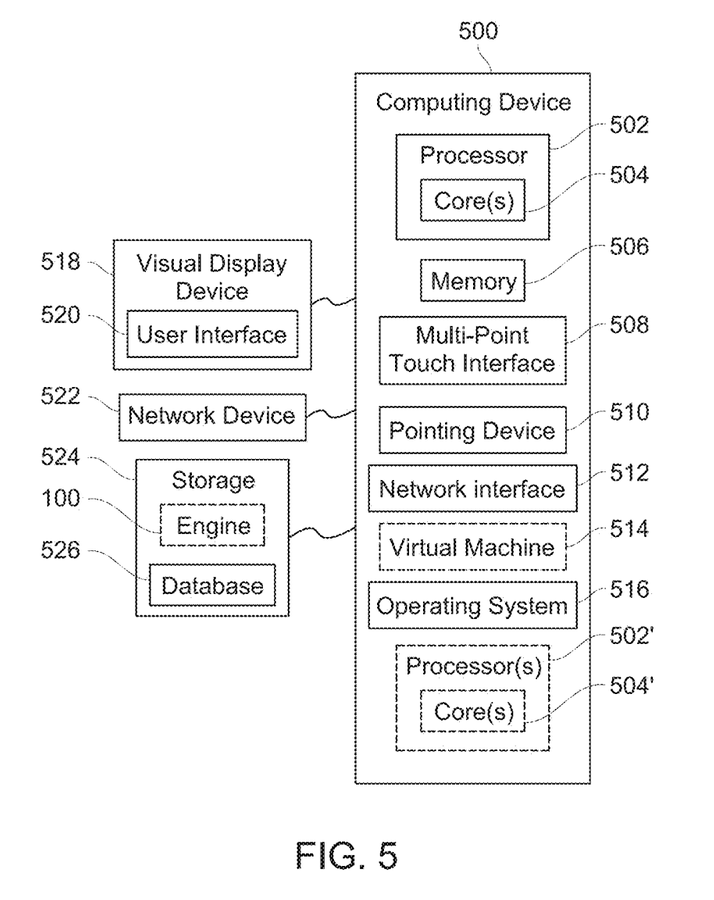
FIG. 5 is a block diagram of an exemplary computing device for implementing embodiments of the present disclosure.

FIG. 5 is a block diagram of an exemplary computing device 500 that may be used in to implement exemplary embodiments of the engine 100. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the engine 100. The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 518, such as a computer monitor, which may display one or more user interfaces 520 that may be provided in accordance with exemplary embodiments. The computing device 500 may include other I/O devices for receiving input from a user, for example, a keyboard or any suitable multi-point touch interface 508, a pointing device 510 (e.g., a mouse). The keyboard 508 and the pointing device 510 may be coupled to the visual display device 518. The computing device 500 may include other suitable conventional I/O peripherals.

The computing device 500 may also include one or more storage devices 524, such as a hard-drive, CD-ROM, or other computer readable media, for storing data and computer-readable instructions and/or software that implement exemplary embodiments of the engine 100 described herein. Exemplary storage device 524 may also store one or more databases for storing any suitable information required to implement exemplary embodiments. For example, exemplary storage device 524 can store one or more databases 526 for storing information, such as MR images, PET images, classification algorithms, pixel density values, attenuation coefficients, density maps, and/or any other information to be used by embodiments of the engine 100. The databases may be updated by manually or automatically at any suitable time to add, delete, and/or update one or more items in the databases.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 500 may run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 516 may be run in native mode or emulated mode. In an exemplary embodiment, the operating system 516 may be run on one or more cloud machine instances.

Figure 6:
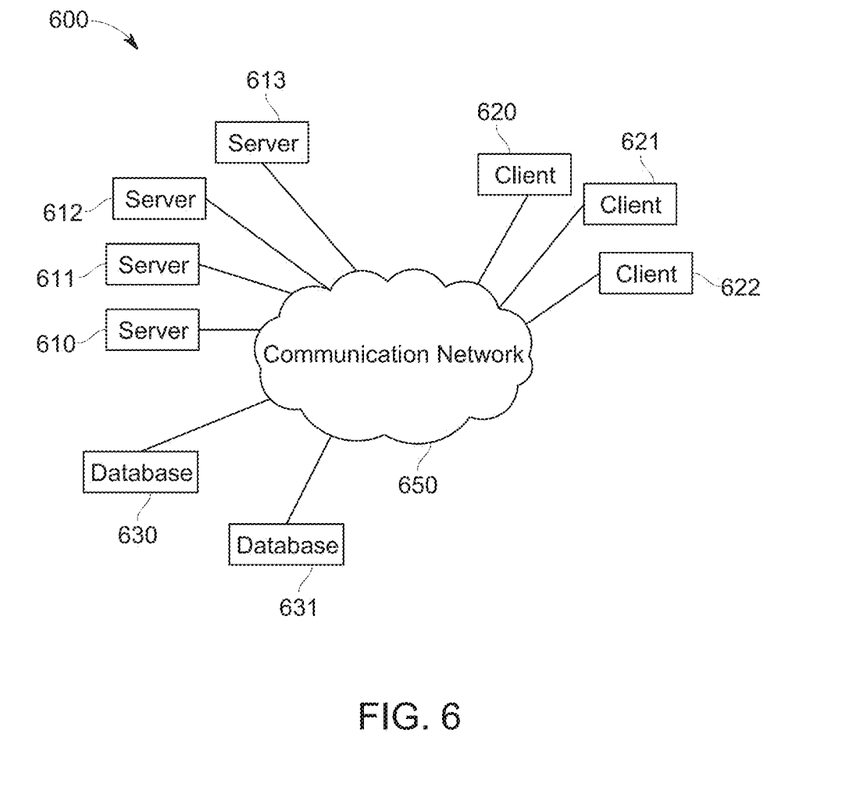
FIG. 6 is a block diagram of an exemplary client-server environment for implementing embodiments of the present disclosure.

FIG. 6 is a block diagram of an exemplary client-server environment 600 configured to implement one or more embodiments of the engine 100. The computing system 600 includes servers 610-613 operatively coupled to clients 620-622, via a communication network 650, which can be any network over which information can be transmitted between devices communicatively coupled to the network. For example, the communication network 650 can be the Internet, Intranet, virtual private network (VPN), wide area network (WAN), local area network (LAN), and the like. The computing system 600 can include repositories or database devices 630, 631, which can be operatively coupled to the servers 610-613, as well as to clients 620-622, via the communications network 650. The servers 610-613, clients 620-622, and database devices 630, 631 can be implemented as computing devices. Those skilled in the art will recognize that the database devices 630, 631 can be incorporated into one or more of the servers 610-613 such that one or more of the servers can include databases.

In some embodiments, the engine 100 can be implemented by a single device, such as the server 610. In some embodiments, the engine 100 can be distributed among different devices (e.g., servers, clients, databases) in the communication network 650 such that one or more components of the engine 100, or portions thereof, can be implemented by different devices in the communication network 650. For example, in illustrative embodiments, the classification engine 110 can be implemented by the server 611, the mapping engine 130 can be implemented by the server 612, and the reconstruction engine 140 can be implemented by the server 613. In exemplary embodiments, the databases 630, 631 can store MR images, PET images, classification algorithms, pixel density values, attenuation coefficients, density maps, and/or any other information to be used by embodiments of the engine 100.

Figure 7:
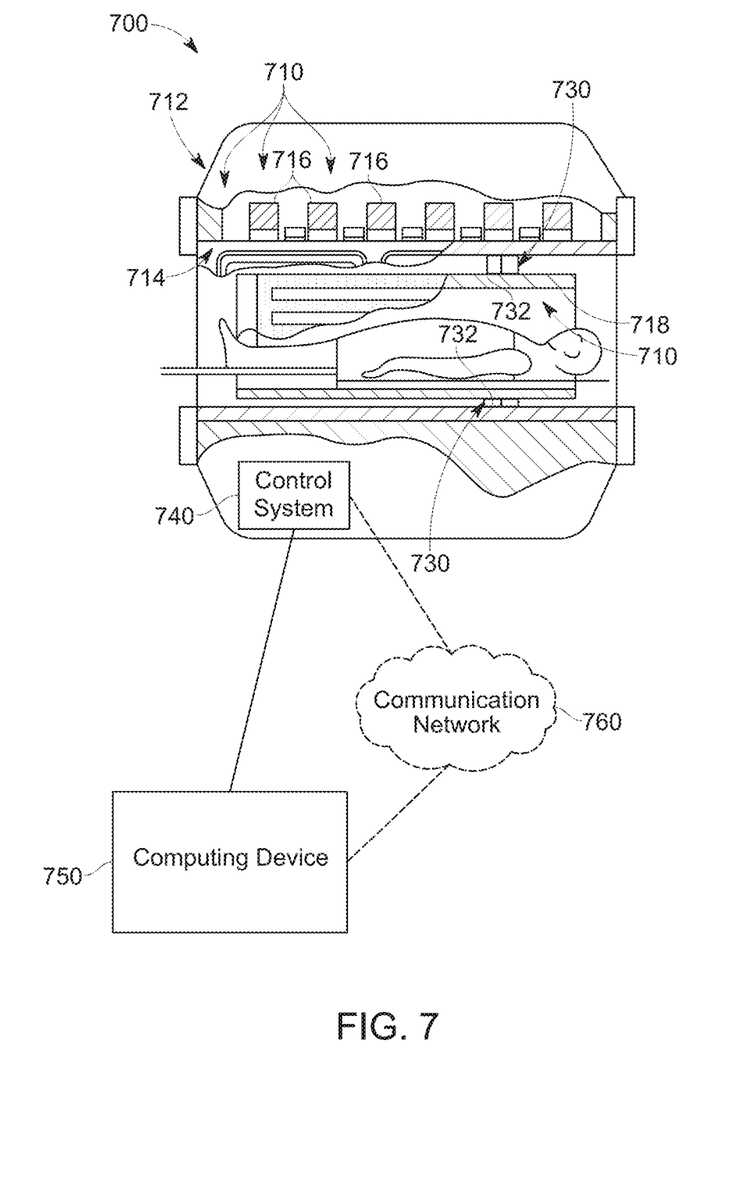
FIG. 7 is an exemplary embodiment of a combined (hybrid) PET and MR image scanner that can be implemented to acquire the PET images and the MR images.

FIG. 7 is illustrative of a hybrid or combined Positron Emission Tomography (PET)-Magnetic Resonance Imaging (MRI) scanner 700. The scanner 700 can include MRI components 710 configured to acquire MR data and PET imaging components 730 configured to acquire PET image data.

The MRI components 710 can include a magnetic assembly 712 and a gradient coil assembly 714, which can be implemented separately or as part of the magnetic assembly 712. The magnet assembly 712 can include a polarizing magnet 716 and a coil assembly 718, which can be implemented as a radio frequency (RF) coil or a phased array receive coil. The coil assembly 718 of the magnetic assembly 712 can be configured to transmit stimulus pulses and/or to receive excitation pulses radiating from the subject in response to the stimulus pulses. The gradient assembly 714 can include one or more physical gradient coils to produce magnetic field gradients to spatially encode acquired MR data output from the scanner 700 according to a k-space or raw data matrix.

The PET imaging components 730 of the scanner 700 can include a positron emission detector 732, configured to detect gamma rays from positron annihilations emitted from a subject. Detector 732 can include scintillators and photovoltaic. Detector 732 can be of any suitable construction for acquiring PET data. Gamma ray incidences detected by detector 732 are transformed, by the photovoltaic of the detector 732, into electrical signals, which can be conditioned and processed to output digital signals that can match gamma ray detections as potential coincidence events. When two gamma rays strike detectors approximately opposite one another, it is possible, absent the interactions of random noise and signal gamma ray detections, that a positron annihilation took place somewhere along the line between the detectors. The coincidences can be sorted and integrated as PET data that can be processed and/or stored via a computing system 750. PET data can be acquired concurrently with MR data acquisition. PET images can be reconstructed via the computing device 750 and can be combined with MR images to produce hybrid structural, metabolic, and/or functional images.

In exemplary embodiment, the scanner 700 can include a control system 740 programmed to control an operation of the MRI components 710 and PET components 730. While the control system 740 is depicted as being included in the scanner 700, those skilled in the art will recognize that the control system, or portions thereof, can be implemented separately and apart from the scanner 700 and can be communicatively coupled to the scanner 700. As one example, the control system 740 can be in communication with a computing device 750 such that the scanner 700 can be controlled, via a computing system 750 communicatively coupled to the control system 740 to transmit data and/or commands to the control system to control an operation of the scanner 700. In some embodiments, the computing device 750 can be in communication with the control system 740 via a communications network 760.

For example, the computing system 750 can configure the control system 740 to control the MRI components 710 and PET components 730 to perform a scan sequence in response to instructions, commands, and/or requests transmitted to the control system 740 by the computing device 750. RF pulses of the scan sequence can have a timing, strength, and shape corresponding to a timing and length of a data acquisition window over which the MR data is to be acquired. Gradient pulses can be produced during the MR data acquisition by controlling one or more physical gradient coils in a gradient coil assembly 714 to produce magnetic field gradients to spatially encode acquired MR data output from the scanner 700 in one or more lines of k-space. MR signals resulting from the excitation pulses, emitted by excited nuclei in a subject, can be sensed by the coil assembly 718, and can be provided to the computing system for processing. MR data is collected and output as one or more sets of raw k-space data. The raw k-space data can be reconstructed (e.g., via Fourier transform) into MR image data which can be displayed, stored, and/or processed by the computing device 750 and/or another device.

Figure 8:
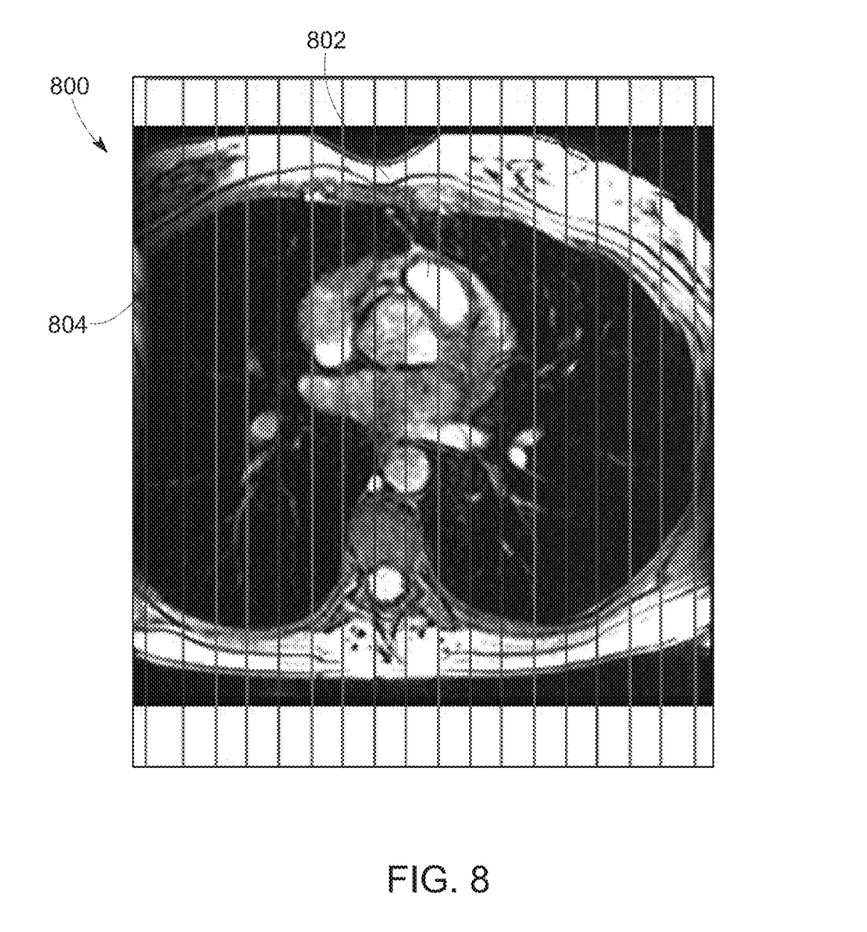
FIG. 8 shows the locations of an exemplary stack of two-dimensional slices of MR images acquired in a sagittal plane to generate multi-slice image data of the pulmonary vasculature for a respiratory gated, respiratory phase of a single breath-hold. The locations are shown as an overlay onto a previously acquired axial plane scout MR image.

In exemplary embodiments, the MR image acquisition can be non-contrast enhanced or contrast-enhanced. In non-contrast enhanced acquisition, a stack of thin two-dimensional slices can be acquired sequentially in any orientation that maximizes the inflow enhancement of blood in the vasculature. For example, as shown in FIG. 8, a stack 800 of overlapping two-dimensional slices are acquired using a spoiled gradient-recalled echo pulse sequence without saturation bands because there is typically no need to acquire preferential arterial or venous images. As shown in FIG. 8, the pulmonary vasculature 802 is substantially brighter than the surrounding lung tissue 804. As an alternative, pulmonary vasculature images can be acquired using a balanced steady-state free-precession pulse (SSFP) sequence (known variously as FIESTA or trueFISP or other vendor-specific names) in a three-dimensional acquisition. Balanced SSFP acquisitions can provide excellent depiction of the vasculature through a mixture of in-flow enhancement and also due to the ratio of T2 to T1 proton relaxation times of blood.

Figure 9:
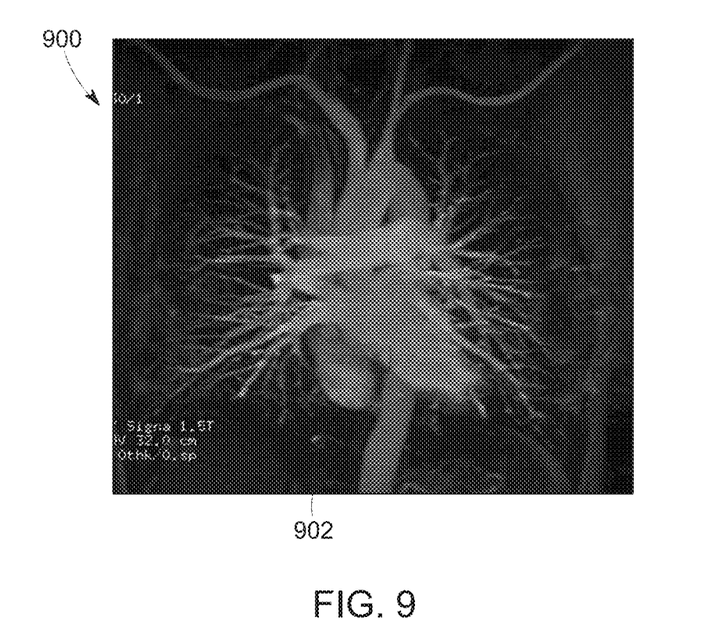
FIG. 9 shows a three dimensional volumetric MR image acquisition of a portion of the lung cavity of a subject in which magnet resonance contrast-media has been used to enhance the pulmonary vasculature.
Figure 10:
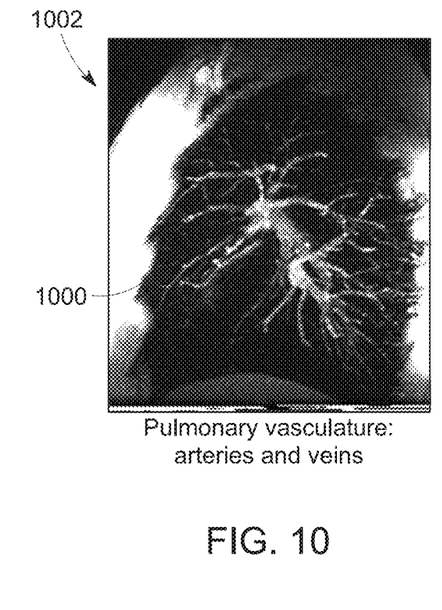
FIG. 10 shows a single slice from a stack of two-dimensional, non-contrast media enhanced MR acquisitions in which both the pulmonary arteries and pulmonary veins are depicted.
Figure 11:
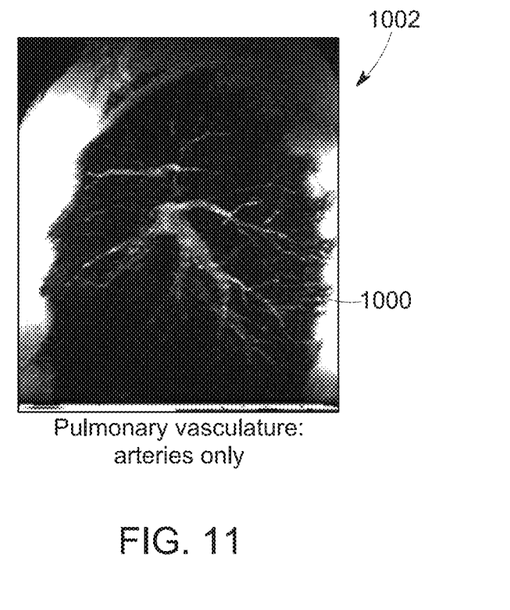
FIG. 11 is shows the single slice from a stack of two-dimensional, non-contrast media enhanced MR acquisitions similar to that of FIG. 10, but with only the pulmonary arteries being depicted.

In exemplary embodiments, MR pulmonary acquisition can be implemented as an exogenous contrast-media (agent) enhanced acquisition using, e.g., a gadolinium chelate. Pulmonary acquisitions can be sped up when an MR contrast agent is used because a fast three-dimensional spoiled gradient echo acquisition that is T1-weighted can be used. An example of a contrast-enhanced acquisition 900 is shown in FIG. 9 and depicts an enhanced imaging of the pulmonary vasculature 902. FIG. 9 shows a maximum intensity projection (MIP) of high signal intensity pixels corresponding to the pulmonary vasculature in the thoracic region. Using contrast-media in a magnetic resonance angiography acquisition can yield preferential images of the arterial or venous vasculature, or both, depending on the acquisition timing. The MR contrast agent can significantly shorten the T1 relaxation time of blood, leading to brighter signal intensity of the vasculature. Once the MR pulmonary images are acquired, the classification engine 110 of the engine 100 (FIG. 1) can be used to define the outer contours of the lungs. In this manner, the pixels within the outer lung contours can be identified into lung tissue and vasculature, with the appropriate densities (attenuation coefficients) assigned. For example, FIG. 10 shows the pulmonary vasculature 1000 including the arteries and veins in a slice 1002 from a stack of two-dimensional slices. FIG. 11 shows the pulmonary vasculature 1000 including only the arteries in the slice 1002 from a stack of two-dimensional slices. Such preferential depiction of arterial vasculature, venous vasculature or both can be easily achieved in non-contrast media enhanced MR angiography via selective spatial saturation. The slice 1002 can provide a basis for the classification engine 110 (FIG. 1) to programmatically identify the pulmonary vasculature and the outer extent of the lung cavity.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A method of correcting lung density variations in a positron emission tomography (PET) image of a subject comprising:
   identifying at least an outer extent of a lung cavity in a magnetic resonance (MR) image corresponding to a thoracic region of the subject in response to an intensity associated with pixels forming the MR image, the MR image corresponding to the PET image of the thoracic region of the subject;
   classifying each pixel within the outer extent of the lung cavity as either pulmonary vasculature or lung tissue;
   assigning a first specified attenuation coefficient to those pixels classified as pulmonary vasculature and a second specified attenuation coefficient to those pixels classified as lung tissue, wherein the first specified attenuation coefficient is greater than the second specified attenuation coefficient; and
   reconstructing the PET image using the assigned attenuation coefficients to correct for attenuation of gamma photons.

2. The method of claim 1, wherein identifying at least the outer extent of the lung cavity comprises:
   defining one of the pixels corresponding to the pulmonary vasculature as a seed pixel; and
   determining the outer extent of the lung cavity starting with the seed pixel and progressing away from the seed pixel towards a chest wall until the pixels corresponding to the chest wall are identified and progressing from the seed pixel towards a diaphragm until the pixels corresponding to the diaphragm are identified,
   wherein the pixels corresponding to the chest wall and the diaphragm have a greater intensity than the pixels corresponding to the lung tissue.

3. The method of claim 1, wherein the first specified attenuation coefficient corresponds to a first density representative of pulmonary vasculature and the second specified attenuation coefficient corresponds to a second density representative of lung tissue.

4. The method of claim 1, further comprising:
   classifying the pixels outside the outer extent of the lung cavity as one of body tissue, bone, or air; and
   assigning a third specified attenuation coefficient to those pixels classified as body tissue, a fourth specified attenuation coefficient to those pixels classified as bone, and a fifth specified attenuation coefficient to those pixels classified as air.

5. The method of claim 1, wherein the MR image and the PET image are acquired concurrently.

6. The method of claim 1, further comprising acquiring the MR image using at least one of a gradient-recalled echo pulse sequence, a spoiled gradient-recalled echo pulse sequence, a balanced steady-state free-precession pulse sequence, exogenous magnetic resonance contrast media, or an endogenous contrast mechanism of inherent inflow enhancement of flowing blood.

7. The method of claim 1, wherein identifying at least the outer extent of the lung cavity comprises employing a classification algorithm implementing at least one of region growing, phase field, active contour, or level set techniques.

8. The method of claim 1, wherein identifying at least the outer extent of the lung cavity comprises:
   estimating a body mask;
   delineating a closed contour of the outer extent of the lung cavity within the body mask based on an air image signal intensity associated with the pixels; and
   providing gradient information and geometric information in terms of curvature and length minimization constraints to control artifacts in classification of the lung cavity.

9. The method of claim 1, wherein identifying at least the outer extent of the lung cavity comprises applying smoothing criteria to the classification of the pixels to define the outer extent of the lung cavity.

10. The method of claim 1, further comprising spatially aligning the MR image with the PET image to align the pixels of the lung cavity in the MR image with corresponding pixels of the lung cavity in the PET image,
    wherein applying attenuation coefficients to correct for attenuation of gamma photons associated with the lung tissue and pulmonary vasculature in a reconstruction of the PET image is based on the alignment of the MR image and PET image prior to reconstruction of PET image.

11. The method of claim 1, wherein the MR image is acquired with respiratory gating to associate the MR image with a respiratory phase and the MR image is temporally aligned with the PET image with respect to the respiratory phase prior to applying the attenuation coefficients.

12. The method of claim 11, further comprising:
    spatially deforming the PET image after reconstruction to reference the respiratory phase; and
    combining a reconstructed and spatially deformed PET image to average a plurality of respiratory phases to form a single individual PET image at a specified respiratory phase.

13. A system to correct lung density variations in a positron emission tomography (PET) image of a subject comprising:
    a computer-readable medium storing information about a magnetic resonance (MR) image of a thoracic region of a subject, the information including information about pixels forming the MR image, the MR image corresponding to a PET image of the thoracic region; and
    a processing device programmed to:
       identify at least an outer extent of a lung cavity in the magnetic resonance (MR) image in response to an intensity associated with the pixels in the MR image;
       classify each pixel within the outer extent of the lung cavity as either pulmonary vasculature or lung tissue;
       assign a first specified attenuation coefficient to those pixels classified as pulmonary vasculature and a second specified attenuation coefficient to those pixels classified as lung tissue, wherein the first specified attenuation coefficient is greater than the second specified attenuation coefficient; and
       reconstruct the PET image using the assigned attenuation coefficients to correct for attenuation of gamma photons.

14. The system of claim 13, wherein the processing device identifies at least the outer extent of the lung cavity by defining one of the pixels corresponding to the pulmonary vasculature as a seed pixel and determines the outer extent of the lung cavity starting with the seed pixel and progressing away from the seed pixel towards a chest wall until the pixels corresponding to the chest wall are identified and progressing from the seed pixel towards a diaphragm until the pixels corresponding to the diaphragm are identified, employing a classification algorithm to determine the outer extent of the lung cavity, wherein the pixels corresponding to the chest wall and the diaphragm have a greater intensity than the pixels corresponding to the lung tissue.

15. The system of claim 13, wherein the first specified attenuation coefficient corresponds to a first density representative of pulmonary vasculature and the second specified attenuation coefficient corresponds to a second density representative of lung tissue.

16. The system of claim 13, wherein the processing device is programmed to:

classify the pixels outside the outer extent of the lung cavity as one of body tissue, bone, or air; and assign a third specified attenuation coefficient to those pixels classified as body tissue, a fourth specified attenuation coefficient to those pixels classified as bone, and a fifth specified attenuation coefficient to those pixels classified as air.

17. The system of claim 13, wherein the MR image is acquired with respiratory gating to associate the MR image with a respiratory phase and the processing device is programmed to:

spatially align the MR image with the PET image to align the lung cavity in the MR image with the lung cavity in the PET image and to apply attenuation coefficients to correct for attenuation of gamma photons associated with the lung tissue and pulmonary vasculature in a reconstruction of the PET image based on the alignment of the MR image and PET image prior to reconstruction of PET image temporally align the MR image and the PET image with respect to the respiratory phase prior to applying the attenuation coefficients spatially deform the PET image after reconstruction to reference the respiratory phase; and combine the reconstructed and spatially deformed PET images to average the PET images for a plurality of respiratory phases to a single individual PET image at a reference respiratory phase.

18. A non-transitory computer-readable medium storing instructions executable by a processing device, wherein execution of the instruction by the processing device causes the processing device to implement a process comprising:

identifying at least an outer extent of a lung cavity in a magnetic resonance (MR) image corresponding to a thoracic region in response to an intensity associated with pixels in the MR image, the MR image corresponding to a PET image of the thoracic region;

classifying each pixel within the outer extent of the lung cavity as either pulmonary vasculature or lung tissue;

assigning a first specified attenuation coefficient to those pixels classified as pulmonary vasculature and a second specified attenuation coefficient to those pixels classified as lung tissue, wherein the first specified attenuation coefficient is greater than the second specified attenuation coefficient; and reconstructing the PET image using the assigned attenuation coefficients to correct for attenuation of gamma photons.

19. The medium of claim 18, wherein identifying at least the outer extent of the lung cavity comprises:

defining one of the pixels corresponding to the pulmonary vasculature as a seed pixel; and determining the outer extent of the lung cavity starting with the seed pixel and progressing away from the seed pixel towards a chest wall until the pixels corresponding to the chest wall are identified and progressing from the seed pixel towards a diaphragm until the pixels corresponding to the diaphragm are identified, wherein the pixels corresponding to the chest wall and the diaphragm have a greater intensity than the pixels corresponding to the lung tissue, and wherein classifying the pixels within the outer extent of the lung cavity by assigning a first attenuation coefficient to the pixels classified as the pulmonary vasculature and assigning a second attenuation coefficient to the pixels classified as the lung tissue.

20. The medium of claim 18, wherein the MR image is acquired with respiratory gating to associate the MR image with a respiratory phase and the processing device is programmed to:

spatially align the MR image with the PET image to align the lung cavity in the MR image with the lung cavity in the PET image and to apply attenuation coefficients to correct for attenuation of gamma photons associated with the lung tissue and pulmonary vasculature in a reconstruction of the PET image based on the alignment of the MR image and PET image prior to reconstruction of PET image temporally align the MR image and the PET image with respect to the respiratory phase prior to applying the attenuation coefficients spatially deform the PET image after reconstruction to reference the respiratory phase; and combine a reconstructed and spatially deformed PET images to average the PET images for a plurality of respiratory phases to form a single individual PET image at a specified respiratory phase.

* * * * *